(12) United States Patent
Hamel et al.

(10) Patent No.: US 12,347,908 B2
(45) Date of Patent: Jul. 1, 2025

(54) REDOX FLOW BATTERY WITH FLOATING POWER MODULE UNDER IMBALANCED CHARGE CONDITIONS

(71) Applicant: LOCKHEED MARTIN ENERGY, LLC, Bethesda, MD (US)

(72) Inventors: Jonathan Hamel, Cambridge, MA (US); Kyra Coffey Holmquest, Somerville, MA (US); Kevin Hartley Beverage, Sterling, MA (US)

(73) Assignee: Lockheed Martin Energy, LLC, Bethesda, MD (US)

( * ) Notice: Subject to any disclaimer, the term of this patent is extended or adjusted under 35 U.S.C. 154(b) by 799 days.

(21) Appl. No.: 17/680,594

(22) Filed: Feb. 25, 2022

(65) Prior Publication Data
US 2023/0275250 A1 Aug. 31, 2023

(51) Int. Cl.
*H01M 8/18* (2006.01)
*H01M 8/0289* (2016.01)
*H01M 8/04537* (2016.01)
*H02J 7/00* (2006.01)
*H02J 7/02* (2016.01)

(52) U.S. Cl.
CPC ......... *H01M 8/188* (2013.01); *H01M 8/0289* (2013.01); *H01M 8/04574* (2013.01); *H02J 7/0048* (2020.01); *H02J 7/0068* (2013.01); *H02J 7/02* (2013.01)

(58) Field of Classification Search
CPC ............... H01M 8/188; H01M 8/0289; H01M 8/04574; H02J 7/0048; H02J 7/0068; H02J 7/02

USPC .......................................................... 429/428
See application file for complete search history.

(56) References Cited

U.S. PATENT DOCUMENTS

| | | | |
|---|---|---|---|
| 4,312,735 A | 1/1982 | Grimes et al. | |
| 10,000,855 B2 | 6/2018 | Beverage et al. | |
| 10,388,978 B2 | 8/2019 | Morris-Cohen et al. | |
| 10,818,952 B2 | 10/2020 | Zhu et al. | |
| 11,791,486 B2 * | 10/2023 | Jung | H01M 8/043 429/428 |
| 2010/0003586 A1 | 1/2010 | Sahu | |
| 2019/0176803 A1 | 6/2019 | Tabatowski-Bush et al. | |
| 2019/0288320 A1 * | 9/2019 | Zhao | H02J 7/0018 |

FOREIGN PATENT DOCUMENTS

| | | |
|---|---|---|
| CN | 113285108 A | 8/2021 |
| WO | 20200144509 A1 | 7/2020 |

OTHER PUBLICATIONS

Extended European Search Report corresponding to European Patent Application No. 23156925, dated Jul. 20, 2023, 6 pages.

* cited by examiner

*Primary Examiner* — James M Erwin
(74) *Attorney, Agent, or Firm* — Baker Botts L.L.P.

(57) ABSTRACT

The present disclosure is directed, in certain embodiments, to a flow cell battery system. A battery management system detects that a first power module and a second power module located adjacent to the first power module are operating at different states of charge. After determining that the second power module is at the lower state of charge than the first power module, a negative-side switch associated with the second power module is adjusted to an open position, thereby preventing flow of electrical current from a negative terminal of the second power module to electrical ground.

20 Claims, 4 Drawing Sheets

REDOX FLOW BATTERY WITH FLOATING POWER MODULE UNDER IMBALANCED CHARGE CONDITIONS

TECHNICAL FIELD OF THE DISCLOSED SUBJECT MATTER

The present disclosure generally relates to energy storage devices, and more specifically to a redox flow battery with floating power module under imbalanced charge conditions.

BACKGROUND OF THE DISCLOSED SUBJECT MATTER

A redox flow battery facilitates energy storage using liquid electrolyte solutions. Electrolytes are pumped through redox cells of the flow battery to facilitate conversion between chemical energy and electricity (e.g., for charging and discharging the flow cell battery). There exists a need for improved redox flow batteries and methods of their operation.

SUMMARY OF THE DISCLOSED SUBJECT MATTER

The purpose and advantages of the disclosed subject matter will be set forth in and are apparent from the description that follows, as well as will be learned by practice of the disclosed subject matter. Additional advantages of the disclosed subject matter will be realized and attained by the devices particularly pointed out in the written description and claims hereof, as well as from the appended drawings.

To achieve these and other advantages and in accordance with the purpose of the disclosed subject matter, as embodied and broadly described, the disclosed subject matter includes a battery system with an AC/DC inverter, a first power module, a second power module, and a battery management system. The first power module includes a first positive terminal electronically coupled to a positive bus connected to a positive side of the AC/DC inverter and a first negative terminal electronically coupled to a first negative-side switch. When closed, the first negative-side switch is operable to allow flow of electrical current from the first negative terminal of the first power module to electrical ground. When open, the first negative-side switch is operable to prevent flow of electrical current from the first negative terminal of the first power module to electrical ground. The second power module is located adjacent to the first power module (i.e., the second power module shares electrolyte manifold used by the first power module, such that the first and second power modules are fluidically connected). The second power module includes a second positive terminal electronically coupled to the positive bus connected to the positive side of the AC/DC inverter and a second negative terminal electronically coupled to a second negative-side switch. When closed, the second negative-side switch is operable to allow flow of electrical current from the second negative terminal of the first power module to electrical ground. When open, the second negative-side switch is operable to prevent flow of electrical current from the negative terminal of the first power module to electrical ground. The battery management system includes a hardware processor configured to detect that the first and second power modules are operating at a different state of charge. The battery management system determines that the second power module is at a lower state of charge than the first power module. After determining that the second power module is at the lower state of charge than the first power module, the second negative-side switch is adjusted to (e.g., moved or placed in) the open position.

Additionally, after determining that the second power module is at the lower state of charge than the first power module, the first negative-side switch may be in the closed position. Adjusting the second negative-side switch to the open position may cause the second power module to electronically float at a predetermined range of voltages relative to an electronic voltage of the first power module. In some embodiments, the hardware processor is further configured to detect that the first and second power modules are operating at a different state of charge by determining that the first power module is in a charging state and the second power module is in a shutdown state.

Furthermore, the battery system may include one or more pumps and corresponding liquid manifolds operable to control a flow of electrolyte solution through cells of the first and second power modules. The one or more pumps and corresponding liquid manifolds may include a first pump and first liquid manifolds configured to provide the flow of electrolyte solution to the first power module and a second pump and second liquid manifolds configured to provide the flow of electrolyte solution to the second power module. The battery system may include an electrolyzer configured to electrolyze an electrolyte solution provided to the second power module.

Moreover, the first positive terminal of the first power module may be electronically coupled to a first positive-side switch. When closed, the first positive-side switch may be operable to allow flow of electrical current from the first positive terminal of the first power module to a positive side of the AC/DC inverter. When open, the first positive-side switch may be operable to prevent flow of electrical current from the first positive terminal of the first power module to the positive side of the AC/DC inverter. The second positive terminal of the second power module may be electronically coupled to a second positive-side switch. When closed, the second positive-side switch may be operable to allow flow of electrical current from the second positive terminal of the second power module to a positive side of the AC/DC inverter. When open, the second positive-side switch may be operable to prevent flow of electrical current from the second positive terminal of the second power module to the positive side of the AC/DC inverter. When the first power module is in a charging state, the first positive-side switch may be closed, and when the second power module is in a shutdown state, the second positive-side switch may be open.

In accordance with another aspect of the disclosed subject matter, a battery management system for a flow cell battery includes an input/output interface and a hardware processor communicatively coupled to the input/output interface. The input/output interface is communicatively coupled to a first negative-side switch associated with a first power module of the flow cell battery and a second negative-side switch associated with a second power module of the flow cell battery. The second power module is located adjacent to the first power module. When closed, the first negative-side switch is operable to allow flow of electrical current from the first negative terminal of the first power module to electrical ground. When open, the first negative-side switch is operable to prevent flow of electrical current from the first negative terminal of the first power module to electrical ground. When closed, the second negative-side switch is operable to allow flow of electrical current from the second negative terminal of the second power module to electrical ground. When open, the second negative-side switch is operable to prevent flow of electrical current from the second negative terminal of the second power module to electrical ground. The hardware processor is communicatively coupled to the input/output interface and configured to detect that the first and second power modules are operating at a different state of charge. The hardware processor determines that the second power module is at a lower state of charge than the first power module. After determining that the second power module is at the lower state of charge than the first power module, the second negative-side switch is adjusted to (e.g., moved or placed in) the open position.

Moreover, after determining that the second power module is at the lower state of charge than the first power module, the first negative-side switch may be in the closed position. Adjusting the second negative-side switch to the open position may cause the second power module to electronically float at a predetermined range of voltages relative to an electronic voltage of the first power module. In some embodiments, the hardware processor is further configured to detect that the first and second power modules are operating at a different state of charge by determining that the first power module is in a charging state and the second power module is in a shutdown state.

Additionally, the battery system may include one or more pumps and corresponding liquid manifolds operable to control a flow of electrolyte solution through cells of the first and second power modules. The one or more pumps and corresponding liquid manifolds may include a first pump and first liquid manifolds configured to provide the flow of electrolyte solution to the first power module and a second pump and second liquid manifolds configured to provide the flow of electrolyte solution to the second power module. The battery system may include an electrolyzer configured to electrolyze an electrolyte solution provided to the second power module.

Furthermore, the input/output interface may be further communicatively coupled to a first positive-side switch associated with the first power module and operable to, when closed, allow flow of electrical current from the first positive terminal of the first power module to a positive side of the AC/DC inverter, and, when open, prevent flow of electrical current from the first positive terminal of the first power module to the positive side of the AC/DC inverter. The input/output interface may be further communicatively coupled to a second positive-side switch associated with the second power module and operable to, when closed, allow flow of electrical current from the second positive terminal of the second power module to the positive side of the AC/DC inverter, and, when open, prevent flow of electrical current from the second positive terminal of the second power module to the positive side of the AC/DC inverter. When the first power module is in a charging state, the first positive-side switch may be closed, and when the second power module is in a shutdown state, the second positive-side switch may be open.

In accordance with another aspect of the disclosed subject matter, a method of operating a flow cell battery includes (1) detecting that a first power module and a second power module located adjacent to the first power module are operating at different states of charge; (2) determining that the second power module is at a lower state of charge than the first power module; and (3) after determining that the second power module is at the lower state of charge than the first power module, adjusting a negative-side switch associated with the second power module to an open position, thereby preventing flow of electrical current from a negative terminal of the second power module to electrical ground.

Additionally, after determining that the second power module is at the lower state of charge than the first power module, a negative-side switch associated with the first power module may be in the closed position, thereby allowing flow of electrical current from a negative terminal of the first power module to electrical ground. Adjusting the second negative-side switch to the open position may cause the second power module to electronically float at a predetermined range of voltages relative to an electronic voltage of the first power module. Detecting that the first and second power modules are operating at a different state of charge may be performed by determining that the first power module is in a charging state and the second power module is in a shutdown state.

Moreover, the method may further include, after determining that the second power module is at the lower state of charge than the first power module, placing a first positive-side switch associated with the first power module in a closed position, such that flow of electrical current from a first positive terminal of the first power module to a positive side of an AC/DC inverter is allowed and placing a second positive-side switch associated with the second power module in an open position, such that flow of electrical current from a second positive terminal of the second power module to the positive side of the AC/DC inverter is prevented.

Technical advantages of certain embodiments of this disclosure may include one or more of the following. For example, this disclosure facilitates flow cell batteries with improved efficiency and with less chance of unwanted electrolyte side reactions. For example, an improved battery management system may actuate negative-side switches, or electronic relays, that electronically float power modules that are at a lower charge state than neighboring or adjacent power module(s), thereby removing a shunt current path that can lead to decreased battery performance.

BRIEF DESCRIPTION OF THE DRAWINGS

The subject matter of the application will be more readily understood from the following detailed description when read in conjunction with the accompanying drawings, in which.

DETAILED DESCRIPTION

This disclosure recognizes that previous flow battery systems suffer from certain drawbacks and disadvantages. For example, in previous flow battery systems a shunt current path may exist between adjacent power modules (i.e., power modules that are fluidically connected) that are operating at different states of charge, resulting in inefficiency and/or unwanted side reactions during operation. This disclosure provides technical solutions to these and other problems of previous technology by electronically floating a power module with a lower charge state than that of one or more adjacent module(s). For example, when two adjacent power modules are at different charge states (e.g., one charging and the other shutdown), the lower charge state (e.g., the shutdown) power module may be electronically disconnected from a shared electrical ground. This removes a shunt current path from the charging power module through the electrolyte solution in the shutdown power module and to electrical ground, which may lead to battery inefficiency and/or unwanted side-reactions.

Figure 1:
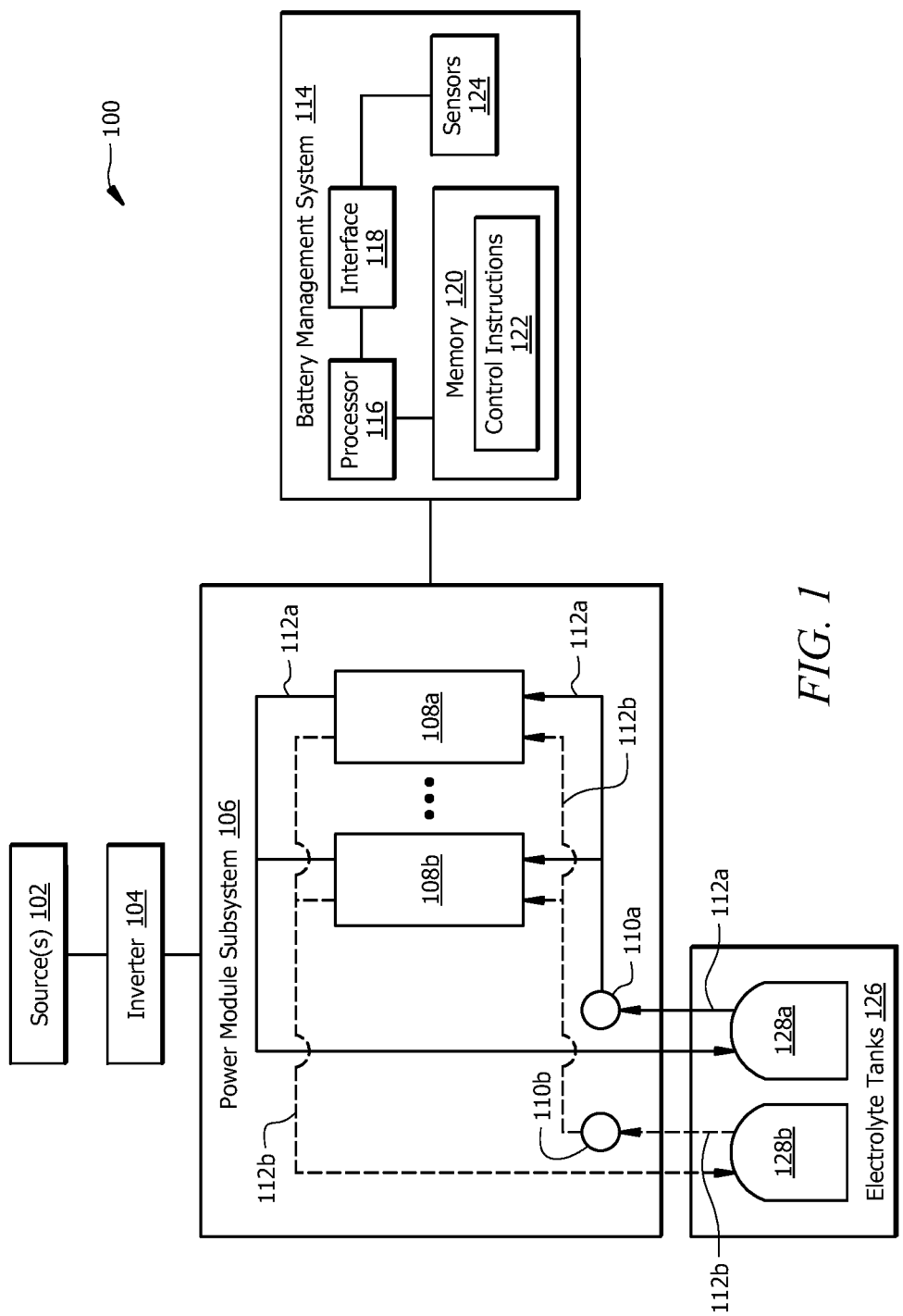
FIG. 1 is a diagram illustrating an example redox flow battery system.
Figure 2:
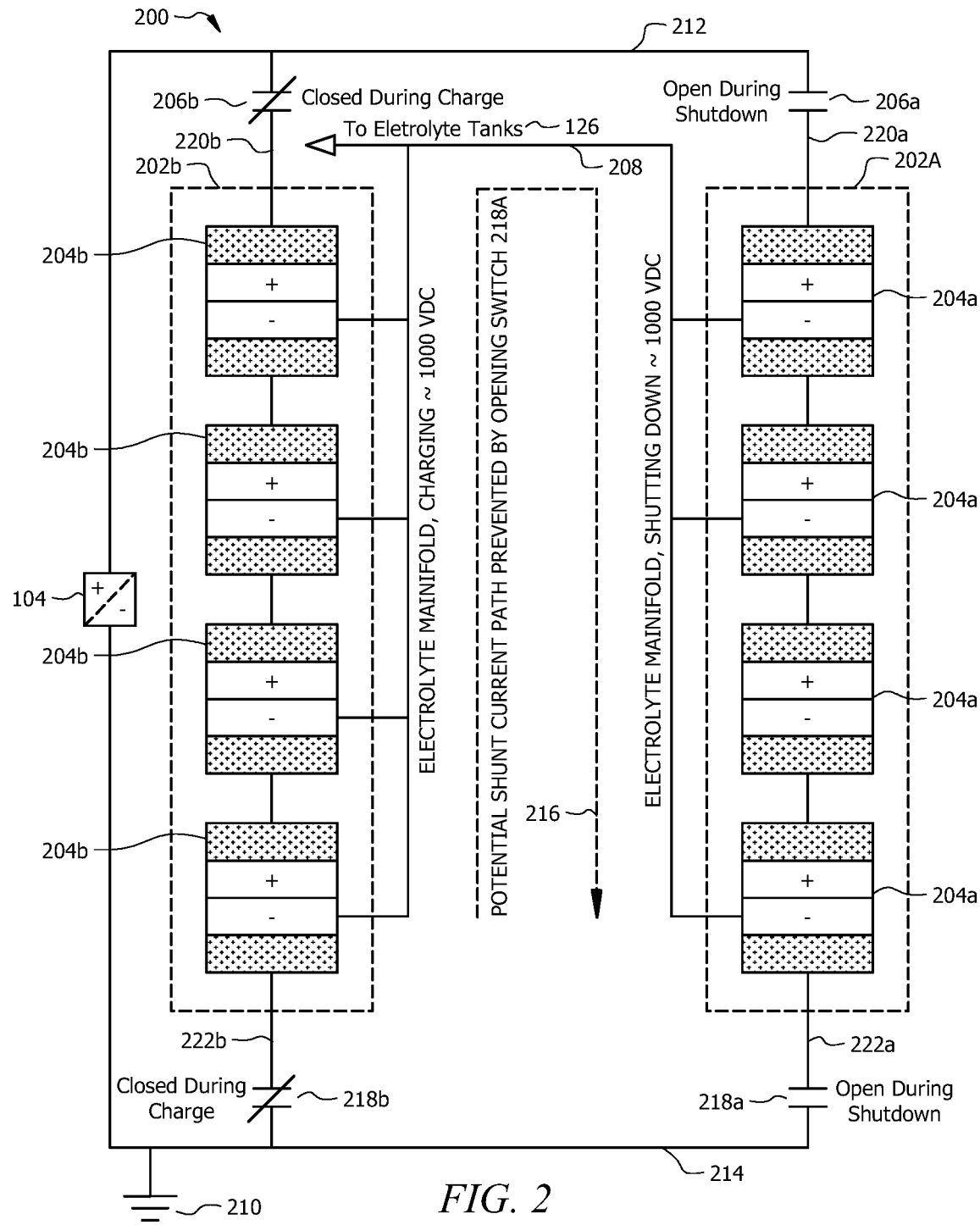
FIG. 2 is a diagram illustrating an example configuration of a power module subsystem of an improved redox flow battery, in accordance with certain embodiments of this disclosure.
Figure 3:
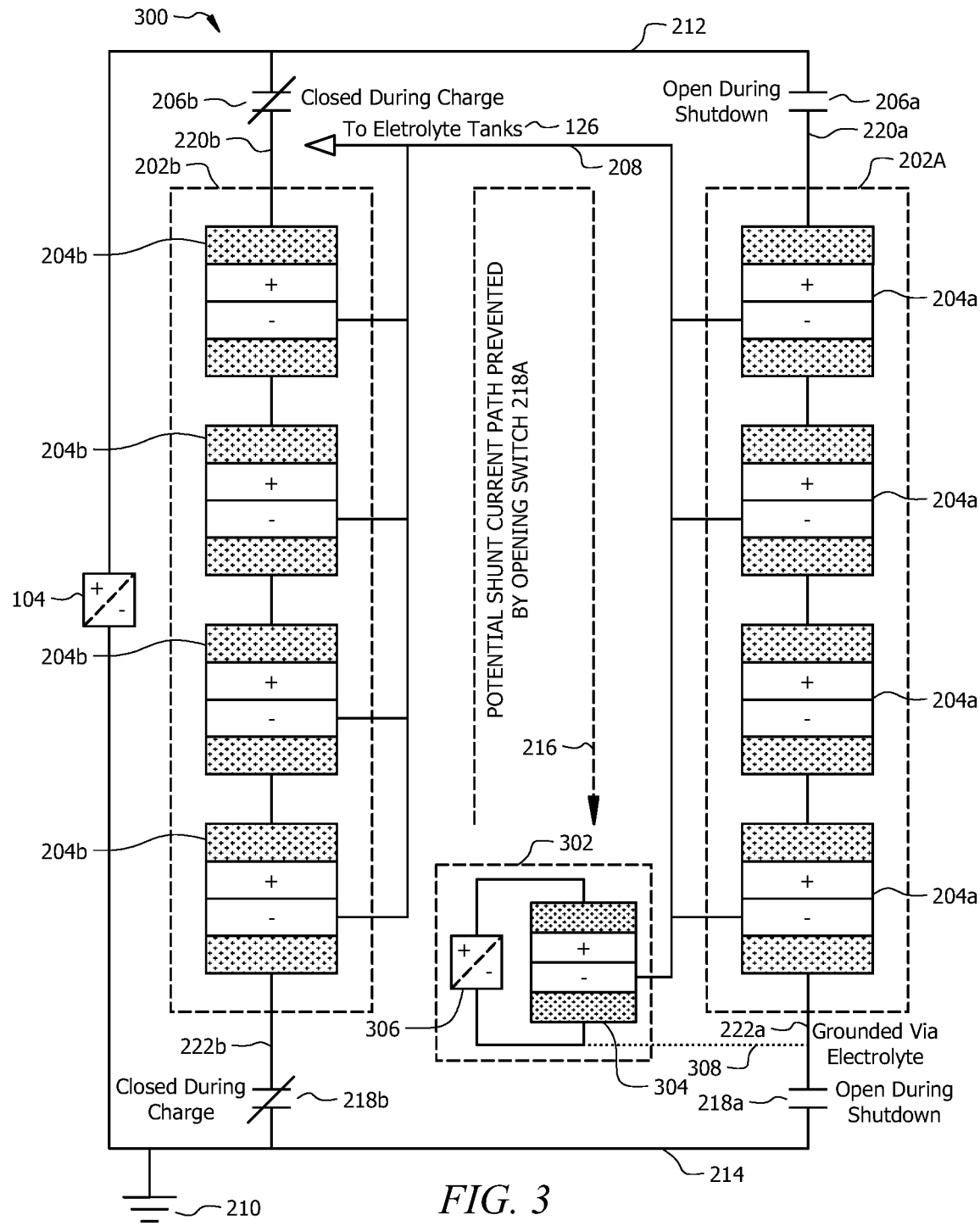
FIG. 3 is a diagram illustrating an example configuration of a power module subsystem of an improved redox flow battery with an electrolyte electrolyzer, in accordance with certain embodiments of this disclosure.
Figure 4:
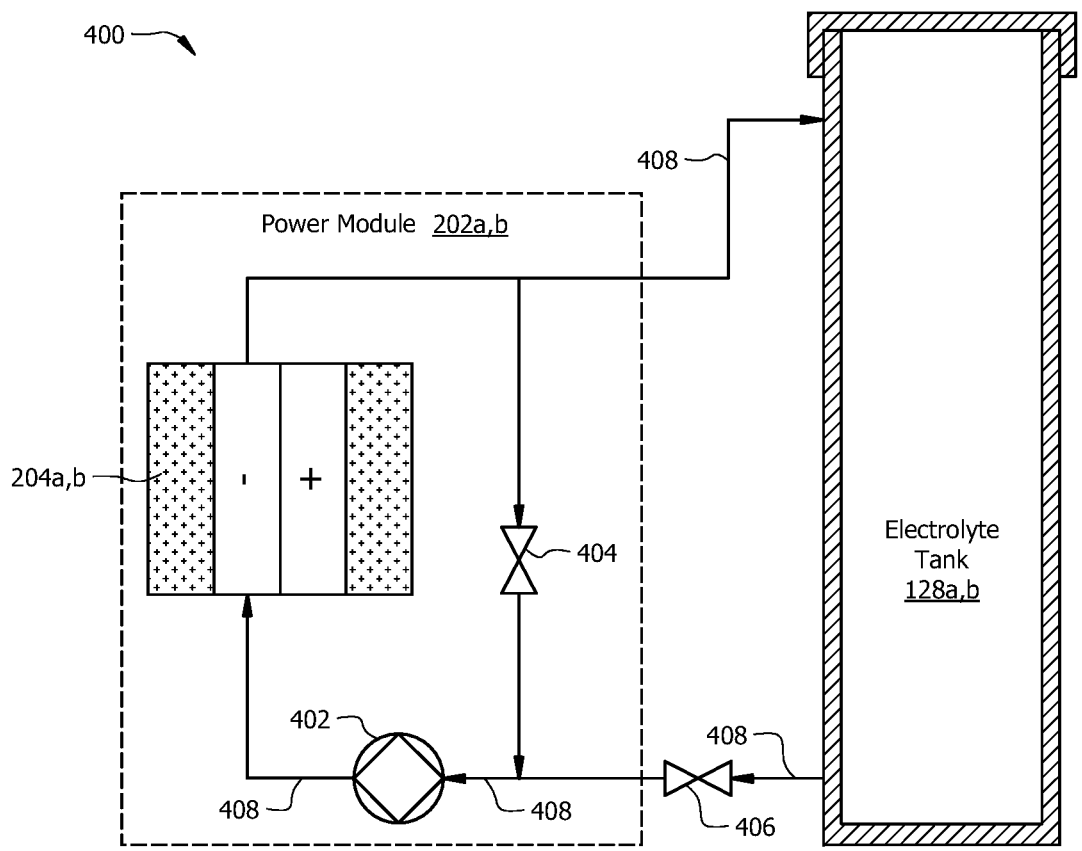
FIG. 4 is a diagram illustrating an example flow manifold configuration of a redox flow battery, in accordance with certain embodiments of this disclosure.
Figure 5:
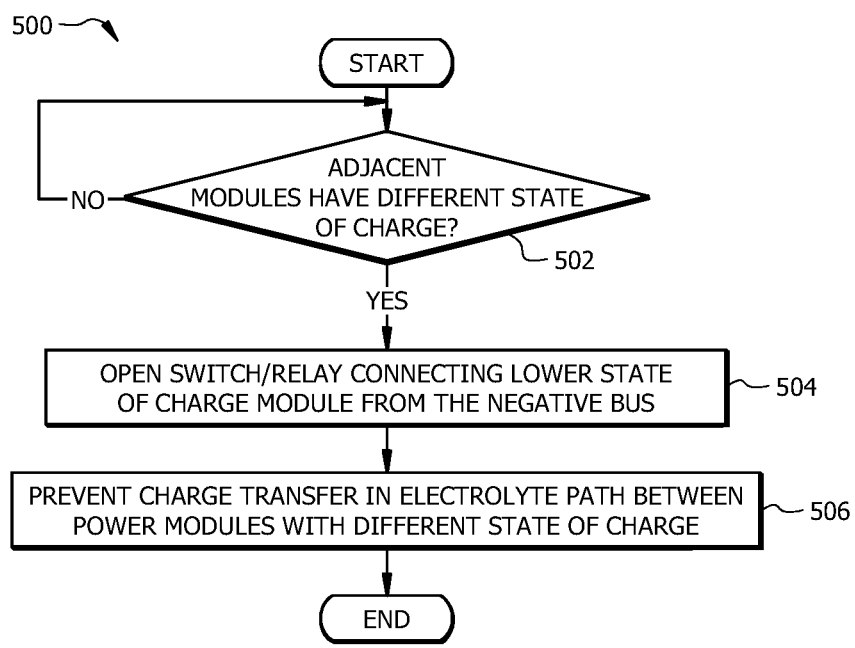
FIG. 5 is a flowchart illustrating an example method of operating a flow cell battery, in accordance with certain embodiments of this disclosure.

Reference will now be made in detail to embodiments of the disclosed subject matter, an example of which is illustrated in the accompanying drawings. FIG. 1 illustrates an example flow cell battery system. FIGS. 2 and 3 illustrate exemplary configurations of power module subsystems of improved flow cell battery systems that prevent development of a shunt current path between adjacent power modules, in accordance with embodiments of this disclosure. FIG. 4 illustrates an example manifold and pump configuration of a portion of an improved flow cell battery system, in accordance with embodiments of this disclosure. FIG. 5 is a flowchart of an exemplary method of operating a flow cell battery system. While these figures often depict or refer to a flow cell battery system with two adjacent power modules, it is to be understood that the present disclosure is not necessarily limited to such a configuration, and the principles disclosed herein may have applicability to various types or forms of flow cell battery systems, as understood by one of skill in the art.

FIG. 1 illustrates an example flow cell battery system 100 of this disclosure. The flow cell battery system 100 includes one or more power sources 102, an AC/DC inverter 104, a power module subsystem 106, a power management system 114, and electrolyte tanks 126. The power source(s) 102 may be any source of electricity, such as one or more solar panels, wind turbines, or the like. In typical applications, the power sources 102 may employ a renewable energy source for which power storage is desirable during off time (e.g., when there is no sunlight or wind). The AC/DC inverter 104 is generally an electronic device that converts typically alternating current (AC) voltage (or current) of the power source(s) to a direct current (DC) voltage (or current) for storage in the power module subsystem 106. The reverse process occurs during discharge of the power module subsystem 106. The AC/DC inverter 104 may include any appropriate electronic circuitry known in the art. Further details of electronic connections between the AC/DC inverter 104 and components of the power module subsystem 106 are illustrated and described with respect to FIGS. 2 and 3 below.

The power module subsystem 106 includes multiple direct current (DC) power modules 108a,b; fluid pumps 110a,b; and corresponding fluid manifolds 112a,b. While the drawings show two adjacent modules 108a,b (e.g., or 202a,b in FIGS. 2 and 3) for simplicity, a multiplicity of modules 108a,b (e.g., or 202a,b in FIGS. 2 and 3) greater than two may be employed. The power modules 108a,b are connected to a common AC/DC inverter 104 and common liquid electrolyte manifolds 112a,b. Example power modules 108a,b are illustrated in greater detail in FIGS. 2 and 3 and described in greater detail below. Briefly, a power module 108a,b may include a set of battery cells (e.g., connected electrically in series). The battery cells include positive and negative cells with corresponding electrodes. The cells are separated by an ion-selective membrane. When charging or discharging of the power modules 108a,b and pumps 110a,b provide flow of electrolyte solution (also referred to as "electrolyte") from electrolyte tanks 126 through the cells of the battery cells of the power modules 108a,b. The electrolyte facilitates charge transfer between the cells. Generally, any number of power modules 108a,b may be connected to a common inverter 104 and/or electrolyte manifolds 112a,b. The fluid pumps 110a,b and electrolyte manifolds 112a,b may be any appropriate fluid pumps and fluid conduit, respectively, for allowing transport of electrolyte solution from the electrolyte tanks 126.

This disclosure recognizes that each power module 108a,b of the power module subsystem 106 may need to be able to operate independently from the other power modules 108a,b on the same inverter 104 and/or electrolyte manifolds 112a,b. It is also desirable for each power module 108a,b to be able to enter and remain in any operating state (e.g., OFF, STANDBY, IDLE, or ACTIVE) while adjacent power modules 108a,b are in a different state. Examples of improved power module subsystems 106 in accordance with embodiments of this disclosure are illustrated in FIGS. 2 and 3 and described below.

The battery management system 114 generally monitors operation of various components of the battery system 100, including the power module subsystem 106 and determines control instructions 122 for effectively operating the battery system 100. For example, the battery management system 114 may be in communication with and control operations of the fluid pumps 110a,b and circuitry of the power modules 108a,b in order to improve their efficiency and reduce or remove opportunities for unwanted side reactions in power modules 108a,b operating at a low state of charge. As an example, which is described in greater detail below with respect to FIGS. 2, 3, and 5, the improved battery management system 114 of this disclosure may detect that adjacent power modules 108a,b are operating at a different state of charge and determine which power module 108a,b is operating at the lower state of charge. The power module 108a,b at the lower state of charge is then electronically floated relative to a common electrical ground of the power modules 108a,b. This removes a possible shunt current path through the power module 108a,b with the lower state of charge, thereby improving overall efficiency and reducing or eliminating unwanted side reactions.

The battery management system 114 may include a processor 116, input/output interface 118, memory 120, and/or one or more sensors 124. The processor 116 includes one or more processors. The processor 116 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 116 may be a programmable logic device, a microcontroller, a microprocessor, or any suitable combination of the preceding. The processor 116 is communicatively coupled to and in signal communication with the input/output interface 118 and memory 120. The processor 116 may be 8-bit, 16-bit, 32-bit, 64-bit or of any other suitable architecture. The processor 116 may include an arithmetic logic unit (ALU) for performing arithmetic and logic operations, processor registers that supply operands to the ALU and store the results of ALU operations, and a control unit that fetches instructions from memory 120 and executes them by directing the coordinated operations of the ALU, registers, and other components.

The memory 120 is operable to store any data, instructions, logic, rules, or code operable to execute the functions of the battery management system 114. For example, the memory may store control instructions 122, which may include instructions for operating switches 206a, b and 218a,b of FIGS. 2 and 3 based on the relative state of charge of adjacent power modules 202a,b, as described in greater detail below. The memory 120 includes one or more disks, tape drives, or solid-state drives, and may be used as an over-flow data storage device, to store programs when such programs are selected for execution, and to store instructions and data that are read during program execution. The memory 120 may be volatile or non-volatile and may comprise read-only memory (ROM), random-access memory (RAM), ternary content-addressable memory (TCAM), dynamic random-access memory (DRAM), and static random-access memory (SRAM).

The interface 118 is configured to enable wired and/or wireless communications. The interface 118 is configured to communicate data between the battery management system 114 and other components of the system 100, such as the power module subsystem 106. The interface 118 is an electronic circuit that is configured to enable communications between devices. For example, the interface 118 may include one or more serial ports (e.g., USB ports or the like) and/or parallel ports (e.g., any type of multi-pin port) for facilitating this communication. As a further example, the interface 118 may include a WIFI interface, a local area network (LAN) interface, a wide area network (WAN) interface, a modem, a switch, or a router. The processor 116 is configured to send and receive data using the interface 118. The interface 118 may be configured to receive data and/or signals from sensors 124. The interface 118 may be configured to use any suitable type of communication protocol as would be appreciated by one of ordinary skill in the art.

Sensors 124 may include any appropriate sensors (e.g., voltage, current, and/or state of charge sensors) for monitoring operations of the battery system 100. For example, a sensor 124 may measure voltages and/or currents at different points along circuitry of the power modules 108a,b. As another example, sensors 124 may measure temperature, pressure, and/or flow rate of electrolyte solution through electrolyte manifolds 112a,b or at another location in the battery system 100. In some embodiments, sensors 124 may help facilitate a determination that adjacent power modules 108a,b are operating at different charge states, such that the power module 108a,b with the lower charge state should be electronically floated, as described in greater detail below with respect to FIGS. 2, 3, and 5.

The electrolyte tanks 126 generally include a first fluid-storing tank 128a for storing a first electrolyte and a second fluid-storing tank 128b for storing a second electrolyte. For example, the first electrolyte stored in fluid-storing tank 128a may be a positive electrolyte (or "posolyte"). Meanwhile, the second electrolyte stored in fluid-storing tank 128b may be a negative electrolyte (or "negolyte"). The positive and negative electrolytes include electroactive species that facilitate charge transfer in the positive and negative cells, respectively of the power modules 108a,b. The electrolytes may be any appropriate electrolytes for a given power module 108a,b type or electrode material. Pumps 110a,b facilitate flow of electrolyte into and out of electrolyte tanks 126 when appropriate (e.g., when a power module 108a,b is charging or discharging, having its electrolyte removed/recycled, undergoing electrolyzation of electrolyte, or undergoing balancing or rebalancing).

Previous Power Module Configuration

FIGS. 2 and 3 show improved power module subsystems 200 and 300 that may be used as the power module subsystem 106 in the battery system 100 of FIG. 1. FIG. 3 shows the same configuration as FIG. 2 with an electrolyzer 302 in-line with the portion of the electrolyte manifold 208 leading to/from the first power module 202a, as described further below. Power module subsystem 200, 300 includes a first power module 202a that is located adjacent to a second power module 202b. Each power module 202a,b includes a set of battery cells 204a,b. While FIGS. 2 and 3 show four cells 204a,b in each power module 202a,b for simplicity, any number of cells 204a, b less than or greater than four may be employed. The battery cells 204a,b include half-cells (marked positive (+) and negative (−)) and electrodes (shown in black). The positive and negative half-cells are separated by an ion-exchange membrane. An electrolyte manifold 208, which may be a portion of electrolyte manifold 112a,b of FIG. 1 returns/delivers electrolyte from/to the cells of battery cells 204a,b to the corresponding electrolyte tanks 126 illustrated in FIG. 1.

A positive-side terminal 220a,b of each power module 202a,b is connected to a positive bus 212 leading to the positive side or terminal of the AC/DC inverter 104. A relay, or switch, 206a,b may be positioned to control the flow of electrical current from each positive-side terminal 220a,b to the positive side of the AC/DC inverter 104. In the open position shown for switch 206a, electric current does not flow from the positive-side terminal 220a to the AC/DC inverter 104. In the closed position shown for switch 206b, electric current flows from the positive-side terminal 220b to the AC/DC inverter 104. In other words, electric current flows when a switch 206a,b is closed and does not flow when the switch 206a,b is open.

A negative-side terminal 222a,b of each power module 202a,b is connected to a negative bus 214 leading to the negative side of the AC/DC inverter 104 and to electrical ground 210. Both power modules 202a,b share a common electrical ground 210. The common electrical ground 210 is a common reference point for voltages of the power modules 202a,b. For example, the electrical ground 210 may be a shared connection to the earth or some other common return path for electrical current. The negative-side terminal 222a,b may be at a lower voltage relative to the positive-side terminal 220a,b (e.g., with respect to the shared electrical ground 210). This disclosure recognizes that problems may be encountered in previous technology when the adjacent power modules 202a,b enter dissimilar operating states that would cause a large state of charge gradient and a corresponding large electrical voltage gradient between the adjacent power modules 202a,b. In such scenarios, the conductive electrolyte being pumped to/from each power module 202a,b can create a shunt current path 216 between the adjacent power modules 216. The shunt current path 216 can allow current from the charging second module 202b to be directed to electrical ground 210 via the illustrated shunt current path 216. This shunt current path 216 can result in system inefficiency and drive unwanted and potentially harmful side-reactions in the first power module 202a that is operating at the lower state of charge.

The improved power module subsystems 200 and 300 overcome the problems associated with the shunt current path 216, using negative-side switches 218a,b that are connected to the negative-side terminals 222a,b of the power modules 202a,b. As described further below and with respect to FIG. 5, these switches 218a,b are operated to prevent the connection to electrical ground 210 for the power module 202a,b that is operating at a lower state of charge than its adjacent power module(s) 202a,b. In the examples of FIGS. 2 and 3, the first power module 202a is in a shutdown state (or in the process of shutting down) and therefore at a lower state of charge than the second power module 202b that is in a charging state. To break the shunt current path 216, switch 218a is opened, causing the first power module 202a to electronically float at or near the electrical voltage of the second power module 202b. For example, the first power module 202a may float at a predetermined range of voltages relative to (e.g., within a predetermined number of Volts above or below) the electronic voltage of the second power module 202b. This prevents development of the shunt current path 216 and associated problems of inefficiency and unwanted side reactions.

Switches 218a,b may be any appropriate electronic switch or relay. For example, the switches 218a,b may be the same as or similar to switches 206a,b described above. When the switch 218a,b associated with a given power module 202a,b is open (as for switch 218a in FIGS. 2 and 3), flow of electrical current is prevented from the negative terminal 222a,b of the power module 202a,b to electrical ground 210. Meanwhile, when the switch 218a,b associated with a given power module 202a,b is closed (as for switch 218b in FIGS. 2 and 3), flow of electrical current is allowed from the negative terminal 222a,b of the power module 202a,b to electrical ground 210.

In certain embodiments, the power management system 114 of FIG. 1 may coordinate, or otherwise control, the opening and closing of switches 218a,b and 206a,b. For example, the control instructions 122 of FIG. 1 may be executed by the processor 116 of the power management system 114 in order to perform functions to prevent the development of the shunt current path 216. For example, the power management system 114 may detect that the adjacent first and second power modules 202a,b are operating at different states of charge. For example, the power management system 114 may detect that the adjacent power modules 202a,b are operating at different states of charge by determining that the first power module 202a is in a shutdown (or shutting down) state and the second power module 202b is in a charging state. The shutdown (or shutting down) state may correspond to the state in which the positive side of the inverter 104 is no longer coupled to the positive terminal 220a of the power module 202a (e.g., with positive-side switch 206a open as shown in FIGS. 2 and 3). In the charging state, the positive side of the inverter 104 is connected to the positive terminal 220b of the power module 202b (e.g., with positive-side switch 206b closed as shown in FIGS. 2 and 3). In some cases, one or more voltage or current measuring sensors (e.g., a voltmeter, ammeter, or the like) may be positioned and configured to detect a difference in the state of charge, voltage, health, resistance, or impedance between the adjacent power modules 202a,b. Such a sensor may correspond to sensor 124 of FIG. 1, described above. These metrics may be used to determine that adjacent power modulus 202a,b are at different states of charge. As used herein, a state of charge may refer to whether a given power module 202a,b is charging or in some other state (e.g., discharging, shut down, etc.). In some cases, a different state of charge may refer to power modules 202a,b being at different relative or reference voltages. For example, in some cases, adjacent power modules 202a,b may both be charging but may have different relative voltages, such that action may need to be taken to prevent shunt current path 216.

The power management system 114 then determines which of the adjacent power modules 202a, b is at the lower state of charge. In the examples of FIGS. 2 and 3, the first power module 202a is at the lower state of charge. After determining that the first power module 202a is at the lower state of charge than the adjacent second power module 202b, the negative-side switch 218a that is connected to the negative terminal 222a of the first power module 202a is moved to the open position, as shown in FIGS. 2 and 3. Switch 218b remains in the closed position (or is changed to the closed position if needed). Opening switch 218a causes the first power module 202a to electronically float at or near the electronic voltage of the second power module 202b. This is illustrated in FIGS. 2 and 3, which show both power modules 202a,b at a voltage of 1000 V. In some cases, to prevent a shunt current path 216, the switch 218a,b may be opened when the associated power module 202a, b enters a non-operational (e.g., OFF, STANDBY, IDLE) state (e.g., irrespective of a relative state of charge of the adjacent power modules 202a,b).

In the exemplary embodiment of FIG. 3, the power module subsystem 300 includes an electrolyzer 302, which includes at least one battery cell 304 and an inverter 306. The electrolyzer 302 may be used to electrolyze negative electrolyte supplied to the first power module 202a when appropriate. As shown in FIG. 3, when negative-side switch 218a is open to protect power module 202a in a lower charge state, the electrolyzer 302 shares a common ground via ground path 308 with its associated power module 202a. As such, the presence of electrolyzer 302 does not prevent the electrical floating of power module 202a described in this disclosure.

Example Electrolyte Manifold Configuration

FIG. 4 shows an exemplary configuration 400 of the electrolyte manifold 112a,b of an example power module subsystem 106. In configuration 400, each power module 202a,b has its own dedicated pump 402 and liquid manifolds 408 that provide the flow of electrolyte solution from the appropriate electrolyte tank 128a,b. Manifolds 408 may correspond to manifolds 112a,b of FIG. 1 and/or manifolds 208 of FIGS. 2 and 3. A fluid valve 404 may be disposed to facilitate an internal recycle loop of electrolyte in the power module 202a,b. Another fluid isolation valve 406 may facilitate restriction of flow into the power module 202a,b, for example, when the power module 202a,b is at a lower charge state than an adjacent power module 202a,b. An optional pump, not shown on FIG. 4, may be included, and dedicated to the function of diverting, or facilitate diverting, liquid electrolyte away from a power module 204a,b and into an electrolyte storage tank. This configuration 400 further mitigates transfer of electrolytes between power modules 202a,b with dissimilar states of charge. For example, when the battery management system 114 detects a different state of charge at adjacent power modules 202a,b, fluid valve 406 may be closed to further reduce chances of developing the shunt current path 216 by breaking the charge transfer path through the electrolyte in manifolds 408. As such, manifold configuration 400 may provide further improvements to the performance of power modules 202a,b.

Example Operation of Flow Cell Battery System

FIG. 5 illustrates an example method 500 of operating the battery system 100 of FIG. 1 with the power module subsystems 200 or 300 of FIGS. 2 and 3 used as the power modules 106 of FIG. 1. The method 500 may be implemented, at least in part, using the processor 116, interface 118, memory 120, and/or sensors 124 of the battery management system 114. The method 500 may begin at step 502 where the battery management system 114 determines whether adjacent power modules 202a,b are at different states of charge. For example, the power modules 202a,b may be determined to be operating at different states of charge (see FIGS. 2 and 3) because the first power module 202a is in a shutdown (or shutting down) state and the second power module 202b is in a charging state. If adjacent power modules 202a,b are found to be at a different state of charge, the power management system proceeds to step 504.

At step 504, the power management system 114 opens the switch 218a,b that connects the negative terminal 222a,b of the power module 202a,b with the lower state of charge to the negative bus 214. This breaks the power module's connection to electrical ground 210, causing the power module 202a,b with the lower state of charge to electronically float at or near the voltage of the adjacent power module 202a,b with the higher state of charge. At step 506, the battery management system 114 may optionally prevent or reduce charge transfer in the electrolyte path between the power modules 202a,b with different states of charge, for example, by closing fluid valve 406 in the manifold configuration 400 of FIG. 4.

In sum, the systems and operations described herein may facilitate improved operation of flow cell batteries without development of a shunt current path between power modules at different states of charge. As a result, flow cell batteries can be operated more reliably and for longer periods of time. Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. The term "approximate" or "near" refers to being within about 30%, 20%, 10%, 5%, or less of a given value or another measurable characteristic. For example, an electronic voltage that is electronically floating near the electronic voltage of an adjacent power module may be within 30%, 20%, 10%, 5%, 4%, 3%, 2%, 1%, or less of the voltage of the adjacent power module.

While the disclosed subject matter is described herein in terms of certain embodiments, those skilled in the art will recognize that various modifications and improvements can be made to the disclosed subject matter without departing from the scope thereof. Additional features known in the art likewise can be incorporated. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having any other possible combination of the features disclosed and claimed herein. As such, the particular features presented herein can be combined with each other in other manners within the scope of the disclosed subject matter such that the disclosed subject matter includes any suitable combination of the features disclosed herein. The foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A flow cell battery system, comprising:
   an AC/DC inverter;
   a first power module comprising:
   a first positive terminal electronically coupled to a positive bus connected to a positive side of the AC/DC inverter;
   a first negative terminal electronically coupled to a first negative-side switch, the first negative-side switch operable to:
   when closed, allow flow of electrical current from the first negative terminal of the first power module to electrical ground; and
   when open, prevent flow of electrical current from the first negative terminal of the first power module to electrical ground;
   a second power module located adjacent to the first power module, the second power module comprising:
   a second positive terminal electronically coupled to the positive bus connected to the positive side of the AC/DC inverter;
   a second negative terminal electronically coupled to a second negative-side switch, the second negative-side switch operable to:
   when closed, allow flow of electrical current from the second negative terminal of the second power module to electrical ground; and
   when open, prevent flow of electrical current from the second negative terminal of the second power module to electrical ground; and
   a battery management system comprising a hardware processor configured to:
   detect that the first and second power modules are operating at a different state of charge;
   determine that the second power module is at a lower state of charge than the first power module,
   after determining that the second power module is at the lower state of charge than the first power module, adjust the second negative-side switch to the open position.

2. The battery system of claim 1, wherein, after determining that the second power module is at the lower state of charge than the first power module, the first negative-side switch is in the closed position.

3. The battery system of claim 1, wherein adjusting the second negative-side switch to the open position causes the second power module to electronically float at a predetermined range of voltages relative to an electronic voltage of the first power module.

4. The battery system of claim 1, wherein the hardware processor is further configured to detect that the first and second power modules are operating at a different state of charge by determining that the first power module is in a charging state and the second power module is in a shutdown state.

5. The battery system of claim 1, further comprising one or more pumps and corresponding liquid manifolds operable to control a flow of electrolyte solution through cells of the first and second power modules.

6. The battery system of claim 5, wherein the one or more pumps and corresponding liquid manifolds comprise:
a first pump and first liquid manifolds configured to provide the flow of electrolyte solution to the first power module; and
a second pump and second liquid manifolds configured to provide the flow of electrolyte solution to the second power module.

7. The battery system of claim 1, wherein:
the first positive terminal of the first power module is electronically coupled to a first positive-side switch, the first positive-side switch operable to:
when closed, allow flow of electrical current from the first positive terminal of the first power module to a positive side of the AC/DC inverter; and
when open, prevent flow of electrical current from the first positive terminal of the first power module to the positive side of the AC/DC inverter; and
the second positive terminal of the second power module is electronically coupled to a second positive-side switch, the second positive-side switch operable to:
when closed, allow flow of electrical current from the second positive terminal of the second power module to a positive side of the AC/DC inverter; and
when open, prevent flow of electrical current from the second positive terminal of the second power module to the positive side of the AC/DC inverter;
wherein when the first power module is in a charging state, the first positive-side switch is closed and when the second power module is in a shutdown state, the second positive-side switch is open.

8. The battery system of claim 1, further comprising an electrolyzer configured to electrolyze an electrolyte solution provided to the second power module.

9. A battery management system for a flow cell battery, the battery management system comprising:
an input/output interface communicatively coupled to:
a first negative-side switch associated with a first power module of the flow cell battery, wherein the first negative-side switch is operable to:
when closed, allow flow of electrical current from the first negative terminal of the first power module to electrical ground; and
when open, prevent flow of electrical current from the first negative terminal of the first power module to electrical ground; and
a second negative-side switch associated with a second power module of the flow cell battery, wherein the second power module is located adjacent to the first power module, wherein the second negative-side switch is operable to:
when closed, allow flow of electrical current from the second negative terminal of the second power module to electrical ground; and
when open, prevent flow of electrical current from the second negative terminal of the second power module to electrical ground; and
a hardware processor communicatively coupled to the input/output interface and configured to:
detect that the first and second power modules are operating at a different state of charge;
determine that the second power module is at a lower state of charge than the first power module,
after determining that the second power module is at the lower state of charge than the first power module, adjust the second negative-side switch to the open position.

10. The battery management system of claim 9, wherein, after determining that the second power module is at the lower state of charge than the first power module, the first negative-side switch is in the closed position.

11. The battery management system of claim 9, wherein adjusting the second negative-side switch to the open position causes the second power module to electronically float at a predetermined range of voltages relative to an electronic voltage of the first power module.

12. The battery management system of claim 9, wherein the hardware processor is further configured to detect that the first and second power modules are operating at a different state of charge by determining that the first power module is in a charging state and the second power module is in a shutdown state.

13. The battery management system of claim 12, wherein the input/output interface is further communicatively coupled to one or more pumps operable to control a flow of electrolyte solution through cells of the first and second power modules.

14. The battery management system of claim 9, wherein the input/output interface is further communicatively coupled to:
a first positive-side switch associated with the first power module and operable to:
when closed, allow flow of electrical current from the first positive terminal of the first power module to a positive side of the AC/DC inverter; and
when open, prevent flow of electrical current from the first positive terminal of the first power module to the positive side of the AC/DC inverter; and
a second positive-side switch associated with the second power module and operable to:
when closed, allow flow of electrical current from the second positive terminal of the second power module to the positive side of the AC/DC inverter; and
when open, prevent flow of electrical current from the second positive terminal of the second power module to the positive side of the AC/DC inverter;
wherein when the first power module is in a charging state, the first positive-side switch is closed and when the second power module is in a shutdown state, the second positive-side switch is open.

15. The battery management system of claim 9, wherein the flow cell battery further comprises an electrolyzer configured to electrolyze an electrolyte solution provided to the second power module.

16. A method of operating a flow cell battery, the method comprising:
detecting that a first power module and a second power module located adjacent to the first power module are operating at different states of charge;
determining that the second power module is at a lower state of charge than the first power module; and
after determining that the second power module is at the lower state of charge than the first power module, adjusting a negative-side switch associated with the second power module to an open position, thereby preventing flow of electrical current from a negative terminal of the second power module to electrical ground.

17. The method of claim 16, wherein, after determining that the second power module is at the lower state of charge than the first power module, a negative-side switch associated with the first power module is in the closed position, thereby allowing flow of electrical current from a negative terminal of the first power module to electrical ground.

18. The method of claim 16, wherein adjusting the second negative-side switch to the open position causes the second power module to electronically float at a predetermined range of voltages relative to an electronic voltage of the first power module.

19. The method of claim 16, further comprising detecting that the first and second power modules are operating at a different state of charge by determining that the first power module is in a charging state and the second power module is in a shutdown state.

20. The method of claim 16, further comprising, after determining that the second power module is at the lower state of charge than the first power module:
  placing a first positive-side switch associated with the first power module in a closed position, such that flow of electrical current from a first positive terminal of the first power module to a positive side of an AC/DC inverter is allowed; and
  placing a second positive-side switch associated with the second power module in an open position, such that flow of electrical current from a second positive terminal of the second power module to the positive side of the AC/DC inverter is prevented.

* * * * *